(12) United States Patent
Yu et al.

(10) Patent No.: US 11,762,768 B2
(45) Date of Patent: Sep. 19, 2023

(54) ACCESSING CIRCUIT OF MEMORY DEVICE AND OPERATION METHOD ABOUT READING DATA FROM MEMORY DEVICE

(71) Applicant: Realtek Semiconductor Corporation, Hsinchu (TW)

(72) Inventors: Yung-Hui Yu, Kaohsiung (TW); Chih-Wea Wang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 59 days.

(21) Appl. No.: 17/136,236

(22) Filed: Dec. 29, 2020

(65) Prior Publication Data
US 2021/0209018 A1  Jul. 8, 2021

(30) Foreign Application Priority Data
Jan. 3, 2020 (TW) ................. 109100232

(51) Int. Cl.
*G06F 12/02* (2006.01)

(52) U.S. Cl.
CPC .. *G06F 12/0284* (2013.01); *G06F 2212/1012* (2013.01); *G06F 2212/1056* (2013.01); *G06F 2212/202* (2013.01)

(58) Field of Classification Search
CPC ............ G06F 12/0284; G06F 12/0862; G06F 12/0846; G06F 12/0851; G06F 12/0607; G06F 2212/1012; G06F 2212/1056; G06F 2212/202; G06F 13/1647
See application file for complete search history.

(56) References Cited

U.S. PATENT DOCUMENTS

| | | | | |
|---|---|---|---|---|
| 4,621,320 A | * | 11/1986 | Holste | G06F 12/0215 365/222 |
| 4,888,679 A | * | 12/1989 | Fossum | G06F 9/383 711/E12.003 |
| 4,918,587 A | * | 4/1990 | Pechter | G06F 12/0607 711/213 |
| 2001/0043507 A1 | | 11/2001 | Ooishi | |
| 2007/0025173 A1 | * | 2/2007 | Cullum | G11C 7/1012 365/230.03 |
| 2007/0180186 A1 | * | 8/2007 | Cornwell | G06F 12/023 711/103 |
| 2007/0255891 A1 | * | 11/2007 | Chow | G06F 13/161 711/103 |

(Continued)

*Primary Examiner* — Michael Krofcheck
(74) *Attorney, Agent, or Firm* — Locke Lord LLP; Tim Tingkang Xia, Esq.

(57) ABSTRACT

A device is provided that includes a first memory and a second memory and an accessing circuit. Actual addresses of the first memory and the second memory alternately correspond to reference addresses of a processing circuit. The accessing circuit is configured to perform the steps outlined below. A read command corresponding to a reference read address is received from the processing circuit to convert the reference read address to an actual read address of the first memory and the second memory. A first read data is read from a first one of the first memory and the second memory according to the actual read address and a second read data is prefetched from a second one of the first memory and a second memory according to a next first read address simultaneously.

17 Claims, 6 Drawing Sheets

(56) References Cited

U.S. PATENT DOCUMENTS

| | | | |
|---|---|---|---|
| 2008/0250211 A1* | 10/2008 | Imamizu | G06F 12/0862 |
| | | | 711/154 |
| 2010/0281232 A1 | 11/2010 | Takagi et al. | |
| 2013/0138867 A1* | 5/2013 | Craft | G06F 3/061 |
| | | | 711/E12.008 |
| 2013/0227229 A1* | 8/2013 | Ishikawa | G11C 7/1006 |
| | | | 711/154 |
| 2014/0136748 A1* | 5/2014 | Por | G06F 9/3838 |
| | | | 710/308 |

* cited by examiner

ACCESSING CIRCUIT OF MEMORY DEVICE AND OPERATION METHOD ABOUT READING DATA FROM MEMORY DEVICE

CROSS-REFERENCE TO RELATED APPLICATION

This application claims priority to Taiwan Application Serial Number 109100232, filed Jan. 3, 2020, which is herein incorporated by reference in its entirety.

BACKGROUND

Field of Invention

The present invention relates to a memory technology. More particularly, the present invention relates to a memory device and an operation method of the same.

Description of Related Art

A memory that performs accessing operations usually requires multiple clock periods. To decrease the waiting time for higher operation frequency, a cache memory is usually added in a processor to improve the operating speed. However, the area taken up and the cost of the processor will increase as such.

Another way to improve the operating speed is to increase the bandwidth of the memory, such that more of the data including multiple words may be read at a time. However, when the read command encounters a branch of addresses, if the addresses are not aligned with the read words, the read time of a target address and fetch time of a next continuous command then require an additional period, decreasing the performance of the processor. Additionally, in terms of writing data, it often requires an additional write register to combine the multiple words to be written at a time, thus the cost is increased due to the additional hardware.

Therefore, how to design a new memory device and an operation method related thereto for dealing with the aforesaid deficiencies is an issue for those in this technical field.

SUMMARY

One purpose of the present disclosure is to provide a memory device and the operation method of the same, in order to solve the problem of the prior art.

To achieve the aforesaid purpose, one aspect of the present disclosure is related to a device, and the device includes a first memory, a second memory and an accessing circuit. The first memory and the second memory are adapted for coupling to a processing circuit. A plurality of actual addresses of the first memory and the second memory alternately correspond to a plurality of reference addresses of a processing circuit. The accessing circuit is coupled to first memory and the second memory. The accessing circuit is configured to: receive a read command corresponding to a reference read address from the processing circuit and convert the reference read address to the actual address of the first memory and the second memory; read a first read data from the first one of the first memory and the second memory, prefetch a second data from the second one of the first memory and the second memory, according to the actual read address and a next first actual read address, simultaneously; response the first read data to the processing circuit; and when the processing circuit receives a next read command corresponding to a next first reference read address and the next first reference read address corresponds to the next first actual read address, output the second read data to the processing circuit.

The other aspect of the present disclosure is related to a method including: receiving the read command corresponding to the reference read address by the accessing circuit from the processing circuit to convert the reference read address to the actual read address of the first memory and the second memory, wherein the reference addresses of the process circuiting correspond to the actual addresses of the first memory and the second memory; reading the first read data from the first one of the first memory and the second, prefetching the second read data from the first memory and the second memory, by the accessing circuit, according to the actual read address and the next first actual read address, simultaneously; outputting the first read data to the to the processing circuit by the accessing circuit; and when the accessing circuit receives the next read command corresponding to the next first reference read address and the next first reference read address corresponds to the next first actual read address, outputting the second read data to the processing circuit.

The device and the method for operating the device in the present disclosure are utilized, through configurations of two memories, in manners of parallel read and prefetch read, to eliminate a read delay caused by access of multiple periods. Additionally, with address configurations associated with two memories that can be controlled alternately and respectively, a branch command is not limited to the alignment of address bits, which decreases a suspend period caused by the branch command.

BRIEF DESCRIPTION OF THE DRAWINGS

The present invention can be more fully understood by reading the following detailed description of the embodiment, with reference made to the accompanying drawings as follows.

DETAILED DESCRIPTION

Figures 1, 2:
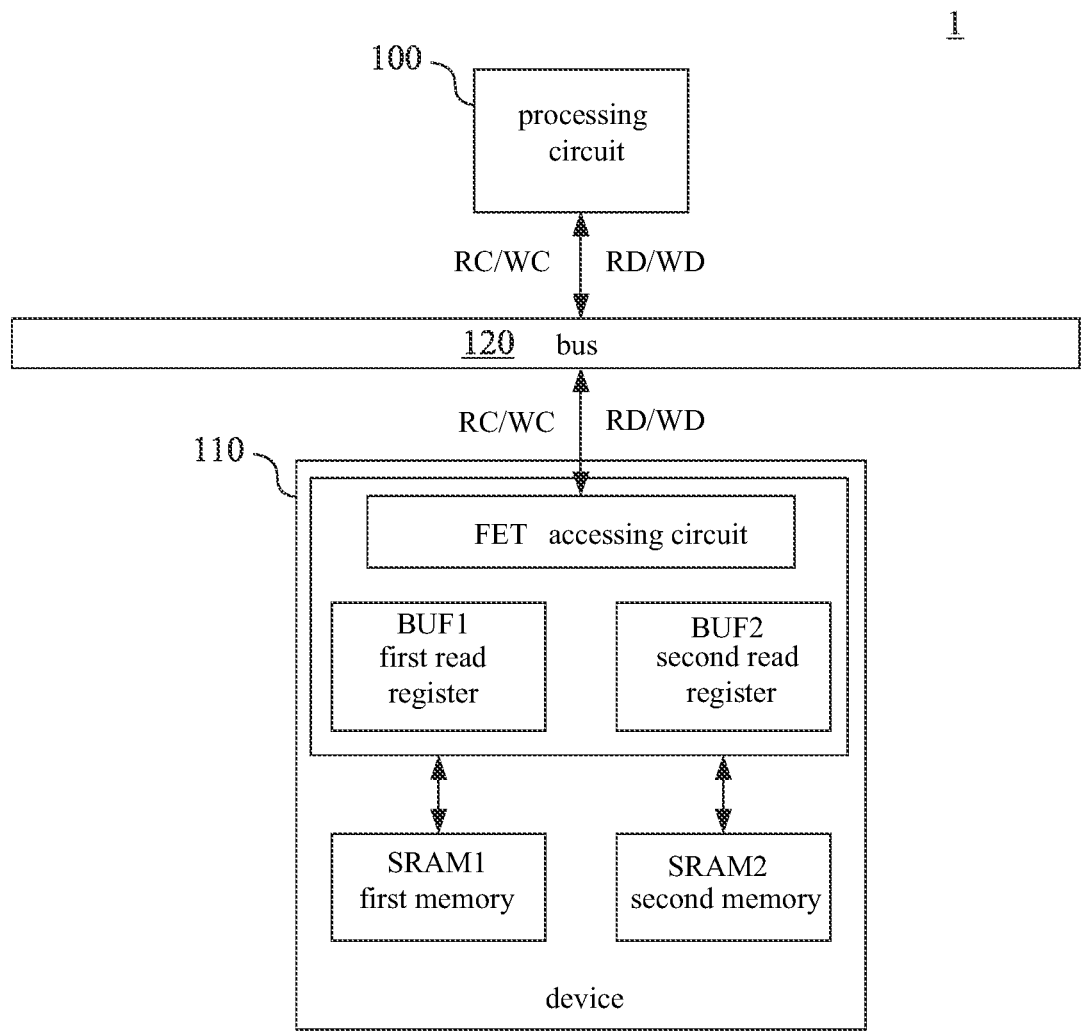
FIG. 1 is a block diagram of a computer system in accordance with one embodiment of the present disclosure.
FIG. 2 is a conversion table of reference addresses of the processing circuit and portion of actual addresses of the first memory and the second memory in accordance with one embodiment of the present disclosure.

Reference is made to FIG. 1. FIG. 1 is a block diagram of a computer system 1 in accordance with one embodiment of the present disclosure. The computer system 1 includes a processing circuit 100 and a device 110.

A processing circuit 100 can access a device 110 by transmitting access commands including, for example, but not limited to, a read command RC and a write command WC. For example, when the processing circuit 100 transmits the read command RC, the processing circuit 100 may read the read data RD from the device 110 according to corresponding addresses. When the processing circuit 100 transmits the write command WC, the processing circuit 100 may write the write data WD to the device 110 according to the corresponding address.

In one embodiment, the aforesaid transmission of commands and data between the processing circuit 100 and the device 110 may be performed by a bus 120 between the processing circuit 100 and the device 110.

It is to be noticed that, the computer system 1 may actually include other elements which may interact with the processing circuit 100 and the device 110, but the number of the elements is not limited to that illustrated in FIG. 1.

The device 110 includes a first memory SRAM1, a second memory SRAM2 and an accessing circuit FET. The first memory SRAM1 and a second memory SRAM2 are adapted for coupling to a processing circuit. The accessing circuit is coupled to first memory SRAM1 and the second memory SRAM2.

In one embodiment, the first memory SRAM1 and the second memory SRAM2 both are static random access memories, but the present disclosure is not limited thereto.

The accessing circuit FET is configured to access the first memory SRAM1 and the second memory SRAM2 according to the read command RC and the write command WC transmitted by the processing circuit 100.

When the device 110 performs the read operation, the accessing circuit FET receives the read command RC from the processing circuit 100, and converts the reference read address corresponded by the read command RC to the actual read address of the first memory SRAM1 and the second memory SRAM2, in order to read corresponding data from the first memory SRAM1 and the second memory SRAM2. The device 110 further includes a first read register BUF1 and a second read register BUF2. The first read register BUF1 and the second read register BUF2 temporarily store data read by accessing circuit FET respectively, and then the accessing circuit FET is configured to output the data to the processing circuit 100.

On the other hand, the device 110 has a structure without the write register. When the device 110 performs the write operation, the accessing circuit FET receives the write command WC of the processing circuit 100, and converts the reference write address corresponded by the write command WC to the actual write address of the first memory SRAM1 and the second memory SRAM2. The corresponding data is written to the first memory SRAM1 and the second memory SRAM2 in a situation that does not require the temporary storage.

The following detail example will be further discussed to illustrate the structure and the operation of the device110.

The multiple reference addresses of the processing circuit 100 alternately correspond to the multiple actual addresses of the first memory SRAM1 and the second memory SRAM2. To discuss in more detail, in one embodiment, the Mth actual address of the actual addresses of the first memory corresponds to the 2M-1th reference address of the reference addresses of the processing circuit, the Mth actual address of the actual addresses of the second memory corresponds to the 2Mth reference address of the reference addresses of the processing circuit, and the M is a positive integer greater than or equal to 1.

Reference is made to FIG. 2. FIG. 2 is a conversion table of reference addresses of the processing circuit 100 and portion of the actual addresses of the first memory SRAM1 and the second memory SRAM2 in accordance with one embodiment of the present disclosure.

As shown in FIG. 2, the first actual address to the fourth actual address of the first memory SRAM1 are represented in the hexadecimal system, and the first actual address to the fourth actual address are continuously 0x0, 0x1, 0x2, 0x3, respectively. Each of the actual addresses of the first memory SRAM1 and the second memory SRAM2 corresponds to one word length, that is, the 32-bit data.

On the other hand, the first reference addresses to the eighth reference addresses of the processing circuit 100 is represented in the hexadecimal system, and the first reference address to the eighth reference address are respectively 0x0, 0x4, 0x8, 0xC, 0x10, 0x14, 0x18, 0x1C, continuously.

As a result, the first to the fourth actual addresses of the first memory SRAM1 respectively correspond to the first, the third, the fifth, the seventh reference addresses of the processing circuit 100, by the aforesaid calculating. The first to the fourth actual addresses of the second memory SRAM2 respectively correspond to the second, the fourth, the sixth, the eighth reference addresses of the processing circuit 100, by the aforesaid calculating.

It is noticed that, there is only a portion of the conversion table illustrating in FIG. 2. The processing circuit 100, the first memory SRAM1 and the second memory SRAM2 may actually include additional corresponding reference addresses and the actual addresses.

The read operation is used for an example, when the accessing circuit FET receives the read command RC from the processing circuit 100, and then converts the corresponding reference read address to the actual read address of the first memory SRAM1 and the second memory SRAM2.

Figure 3:
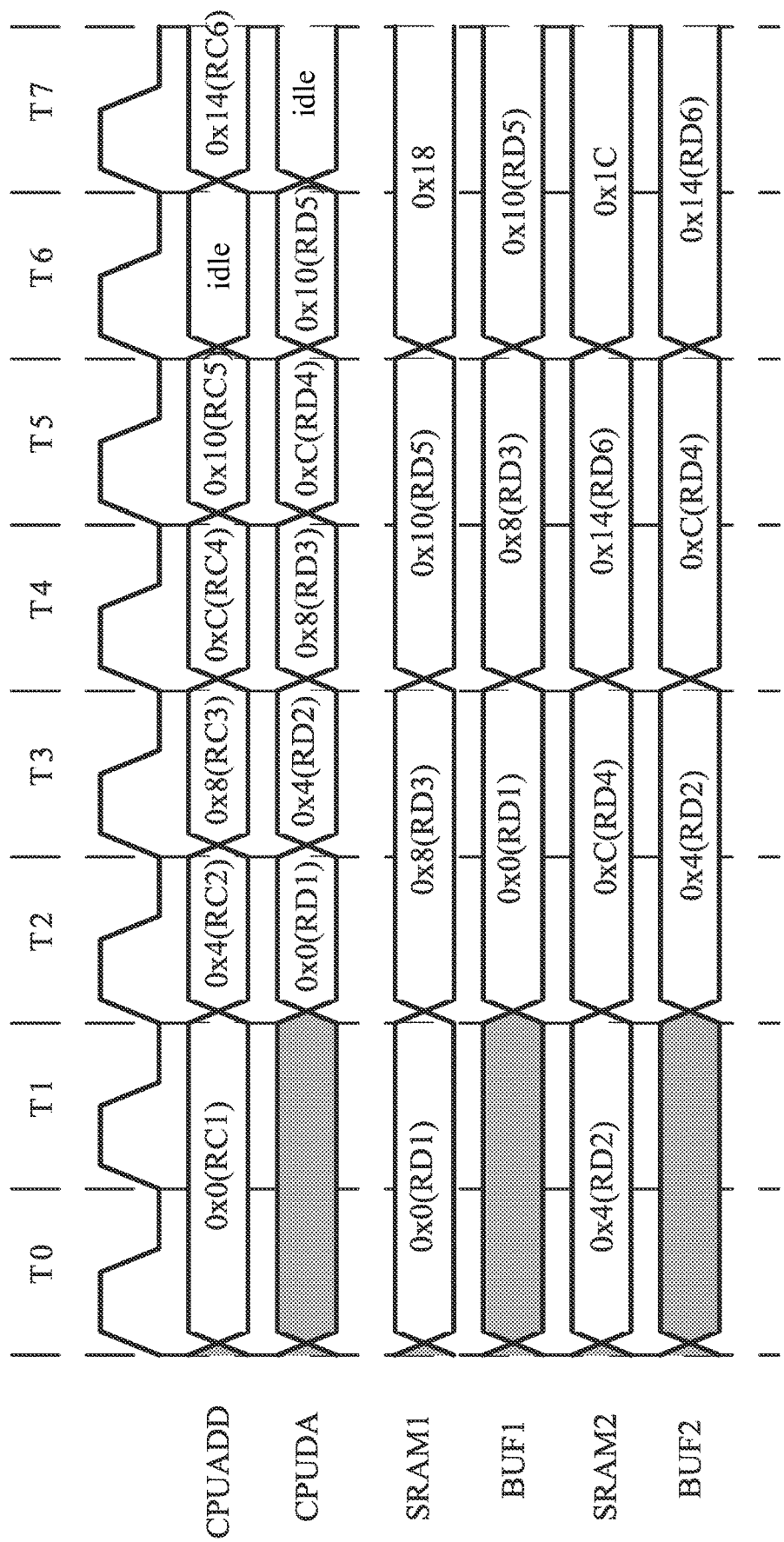
FIG. 3 is a timing diagram of performing read operation of the device in accordance with one embodiment of the present disclosure.

Reference is made to FIG. 3. FIG. 3 is a timing diagram of performing read operation of the device 110 in accordance with one embodiment of the present disclosure.

In the FIG. 3, the reference read address corresponded by the read command RC of the processing circuit 100 is represented in CPUADD, the data outputted by the accessing circuit to the processing circuit 100 is represented in CPUDA, the data read by the first memory SRAM1 is represented in SRAM1, the data read by the second memory SRAM2 is represented in SRAM2, the data temporarily stored by the first read register BUF1 is represented in BUF1, and the data temporarily stored by the second read register BUF2 is represented in BUF2.

As shown in FIG. 3, the signal and data are transmitted between the processing circuit 100, the first memory SRAM1 and the second memory SRAM2 are operated according to the clock signal CLK. Wherein, the read command RC of the processing circuit 100 is transmitted in at least one of the unit clocks. The data of the first memory SRAM1 and the second memory SRAM2 are read in two of the unit clocks.

In the unit clock T0, the accessing circuit FET receives the first read command RC1 corresponding to the reference read address 0x0 from the processing circuit 100 through, for example, but not limited to, the bus 120.

And then, the accessing circuit FET reads the first read data RD1 from the first memory SRAM1, and prefetches the second read data RD2 from the second memory SRAM2, according to the actual read address (the actual address 0x0 of the first memory SRAM1, and which corresponds to the reference read address 0x0 of the processing circuit 100) and the next first actual read address (the actual address 0x0 of the second memory SRAM2, and which corresponds to the reference read address 0x4 of the processing circuit 100).

In the unit clock T1, the first memory SRAM1 and the second memory SRAM2 require two of the unit clocks to read. As a result, the processing circuit 100 is suspended.

In the unit clock T2, the first read data RD1 and the second read data RD2 have been temporarily stored in the first read register BUF1 and the second read register BUF2. Meanwhile, the accessing circuit FET outputs the first read data RD1 to the processing circuit 100 in one of the unit clocks.

It is noticed that, in actual operation, the first memory SRAM1 requires two of the unit clocks to read. As a result, in the unit clock T2, the first read data RD1 can also be selectively outputted to processing circuit 100 by the accessing circuit FET instead of being temporarily stored by the first read register BUF1, but the present disclosure is not limited thereto.

Meanwhile, the accessing circuit FET receives the next read command RC2 from the processing circuit 100. In the present embodiment, the next first reference read address corresponded by the read command RC2 is 0x4.

The accessing circuit FET determines that the next first reference read address corresponds to the aforesaid next first actual read address, in order to prefetch the third read data RD3 from the first memory, and prefetch the fourth read data RD4 from the second memory SRAM2, according to the next second actual read address (the actual address 0x1 of the first memory SRAM1, and the actual address 0x1 of the first memory SRAM1 corresponds to the reference read address 0x8 of the processing circuit 100) and the next third actual read address (the actual address 0x1 of the second memory SRAM2, and the actual address 0x1 of the second memory SRAM2 corresponds to the reference read address 0xC of the processing circuit 100).

In the unit clock T3, since the reference read address corresponded by the read command RC2 received by the accessing circuit FET in the unit clock T2 is 0x4, which matches the second read data RD2 prefetched from the second memory SRAM2 by the accessing circuit FET. As a result, the accessing circuit FET outputs the second read data RD2 from the second read register BUF2 to the processing circuit 100.

Meanwhile, the accessing circuit FET receives the next read command RC3 from the processing circuit 100. In the present embodiment, the reference read address corresponded by the read command RC3 is 0x8. The accessing circuit FET determines that the reference read address corresponds to the aforesaid third read data RD3 which has been prefetched, and does not perform other operation.

In the unit clock T4, the read command RC3 received by the access FET in the unit clock T3 corresponds to the reference read address 0x8, which matches the third read data prefetched from the first memory SRAM1 by the accessing circuit FET. As a result, the accessing circuit FET will output the third read data RD3 from the first read register BUF1 to the processing circuit 100.

Similarly, as the above mentioned, in the actual operation, the first memory SRAM1 requires two of the unit clocks to read. Therefore, in the unit clock T4, the third read data RD3 can also be selectively outputted by the accessing circuit FET to the processing circuit 100 instead of being temporarily stored by the first read register BUF1, but the present disclosure is not limited thereto.

Meanwhile, the accessing circuit FET receives the next read command RC4 from the processing circuit 100. In the present embodiment, the read command RC4 corresponds to the reference read address 0xC. The accessing circuit FET determines the reference read address corresponds to the aforesaid fourth read data RD4 which has been prefetched, and the accessing circuit prefetches two read data from the first memory SRAM1 and the second memory SRAM2 according to the next first actual read address (the actual address of the first memory SRAM1 is 0x2, and which corresponds to the reference read address 0x10 of the processing circuit 100) and the actual read address after the next first actual read address (the actual address of the second memory SRAM2 is 0x2, and which corresponds to the reference read address 0x14 of the processing circuit 100).

As a result, when the multiple read commands RC received by the accessing circuit FET from the processing circuit 100 are all correspond to the continuous reference read address, the accessing circuit FET will continuously read the data until unit clock T5, uninterrupted.

In the unit clock T6, due to the idle sate of the processing circuit 100, the accessing circuit FET does not receive the read command RC from the processing circuit 100, and the accessing circuit FET continuously prefetches two read data. Therefore, when the reference read address of the read command RC received by the accessing circuit FET in the unit clock T7 is still continuous with the previous read address, the prefetching mechanism is benefit to the read operation of the device 110 instead of generating the unnecessary suspension.

Figure 4:
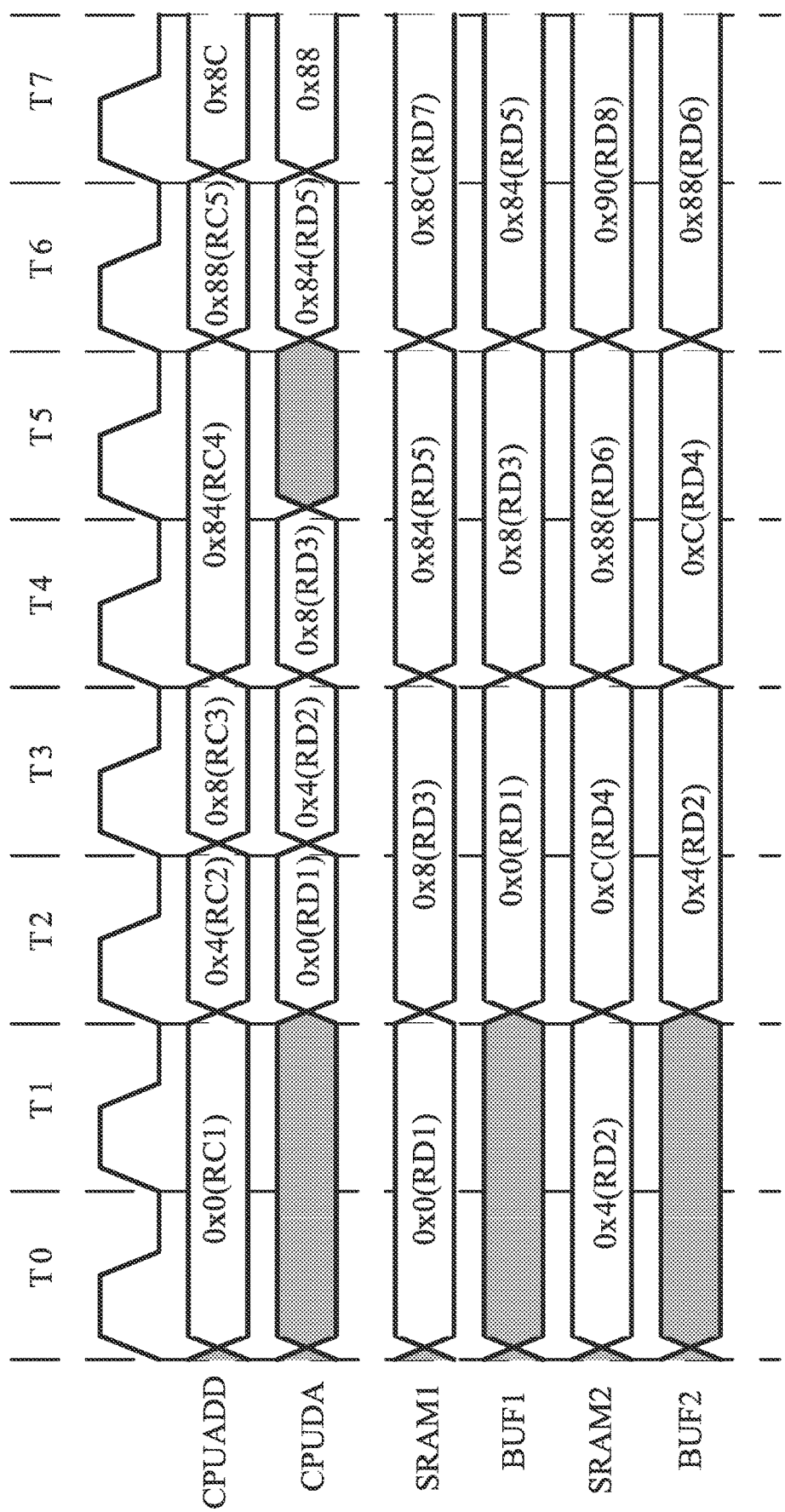
FIG. 4 is a timing diagram of performing read operation of the device in accordance with another embodiment of the present disclosure.

Reference is made to FIG. 4. FIG. 4 is a timing diagram of performing read operation of the device 110 in accordance with another embodiment of the present disclosure. The record marks of FIG. 4 are identical to the record marks of FIG. 3. Therefore, no more discussed here. Furthermore, the operations of the unit clocks T0-T3 in FIG. 4 are identical to the operations of the unit clocks T0-T3 in FIG. 3. Therefore, no more discussed here.

In the present embodiment, in the unit clock T4, the read command RC4 received by the accessing circuit FET corresponds to the reference read address 0x84 instead of 0xC. Such the reference read address is not continuous with the reference read address 0x8 corresponded by the previous read command RC3. Therefore, the read command RC4 is a branch command escaped from the original read command corresponding to the continuous read address.

Although the first read register BUF1 and the second read register BUF2 temporarily store the third read data RD3 and the fourth read data RD4, which have been prefetched and respectively correspond to the reference read address 0x8 and 0xC. Instead of outputting the fourth read data RD4 to the processing circuit 100 according to the read command RC3 in the next unit clock T5, the accessing circuit FET could only output the third read data RD3 to the processing circuit 100 according to the read command RD3 in the unit clock T4.

Therefore, in the unit clock T4, the accessing circuit FET will read the fifth read data RD5 (the fifth read data RD5 corresponds to the reference read address 0x84 of the processing circuit 100) according to the read command RC4, and prefetches the sixth read data RD6 (the sixth read data RD6 corresponds to the reference read address 0x88 of the processing circuit 100). The corresponding relationship in the conversion table illustrating in FIG. 2 is used for an example, the fifth read data RD5 is read from the second memory SRAM2, and the sixth read data RD6 is read from the first memory SRAM1.

The processing circuit 100 is suspended in the unit clock T5, because of reading data requires two of the unit clocks.

In the unit clock T6, the accessing circuit FET receives the read command RC5 from the processing circuit 100, and the reference read address corresponded by the read command RC5 is 0x88, which corresponds to the sixth read data RD6 which has been prefetched.

Therefore, the accessing circuit FET not only outputs the fifth read data RD5 to the processing circuit 100, but also prefetches the seventh read data RD7 and the eighth read data RD8 from the second memory SRAM2 and the first memory SRAM1, the seventh read data RD7 and the eighth read data RD8 respectively correspond to the reference read address 0x8C and 0x90. The subsequent operation of each unit clock is identical to the state of the reference read address continuous with each other of the read command. Therefore, no more discussed here.

In the part of the techniques, although the access length of the single memory is increased to the data amount to read two words in one time, the target address to be read must be aligned with 64 bits. When the branch command is encountered during the memory reading, and the branch target addresses are not aligned with 64 bits, the read time of the target address and the fetch time of the next continuous command of the target address both require two of the unit clocks, and the access of the processing circuit must be suspended in multiple periods.

The device 110 in the present disclosure is utilized, through configurations of two memories, in the parallel read manner and the command prefethch manner. And, the staggered addresses configuration of the two memories could be respectively controlled, such that the branch command will be not constrained by the alignment of the 64 bits, the suspend period caused by the branch command will then be decreased.

On the other hand, the write operation is used for an example, the accessing circuit FET receives the read command WC corresponding to one reference write address from the processing circuit 100, and converts the reference write address to the actual address of the first memory SRAM1 and the second memory SRAM2, in order to determine the address to actually write the data.

Figure 5:
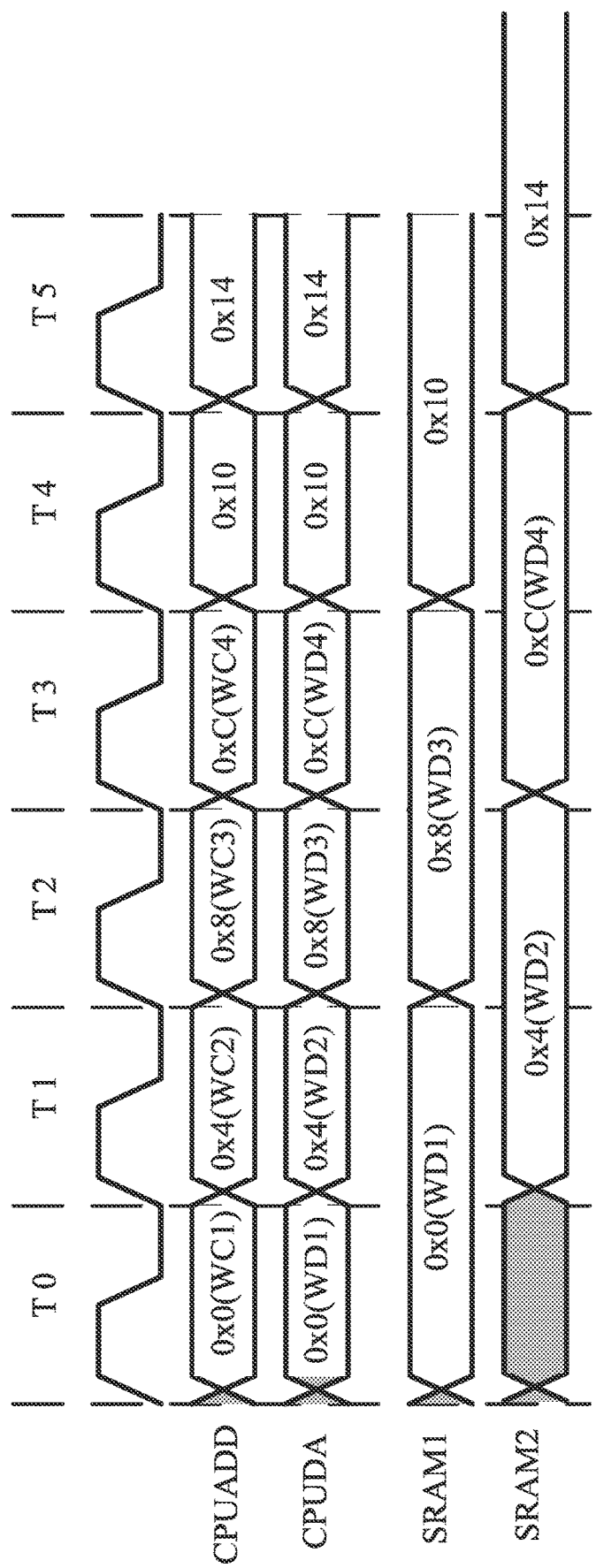
FIG. 5 is a timing diagram of performing write operation of the device in accordance with one embodiment of the present disclosure.

Reference is made to FIG. 5. FIG. 5 is a timing diagram of performing write operation of the device 110 in accordance with one embodiment of the present disclosure.

As shown in FIG. 5, in unit clocks T0-T3, the accessing circuit FET receives the write commands WC1-WC4, sequentially. Each of the write commands WC1-WC4 is received in one of the unit clocks, and the write commands WC1-WC4 respectively correspond to the continuous reference write addresses 0x0, 0x4, 0x8 and 0xC.

Wherein, the reference write address 0x0, 0x4, 0x8 and 0xC respectively correspond to the actual address 0x0 of the first memory SRAM1, the actual address 0x0 of the second memory SRAM2, the actual address 0x1 of the first memory SRAM1 and the actual address 0x1 of the second memory SRAM2.

The first memory SRAM1 and the second memory SRAM2 require two of the unit clocks to write the data, and the first memory SRAM1 and the second memory SRAM2 can respectively access the data, independently. As a result, the accessing circuit FET sequentially writes the write data WD1-WD4 corresponding to the write command WC1-WC4 to the aforesaid addresses of the first memory SRAM1 and the second memory SRAM2 in the unit clocks T0-T3. Similarly, there can be operated according to the identical manner after unit clock T4. Therefore, no more discussed here.

Therefore, the accessing circuit FET can write one piece of data in each of the unit clocks without any suspended situation, and the configuration of the write register is not required.

Figure 6:
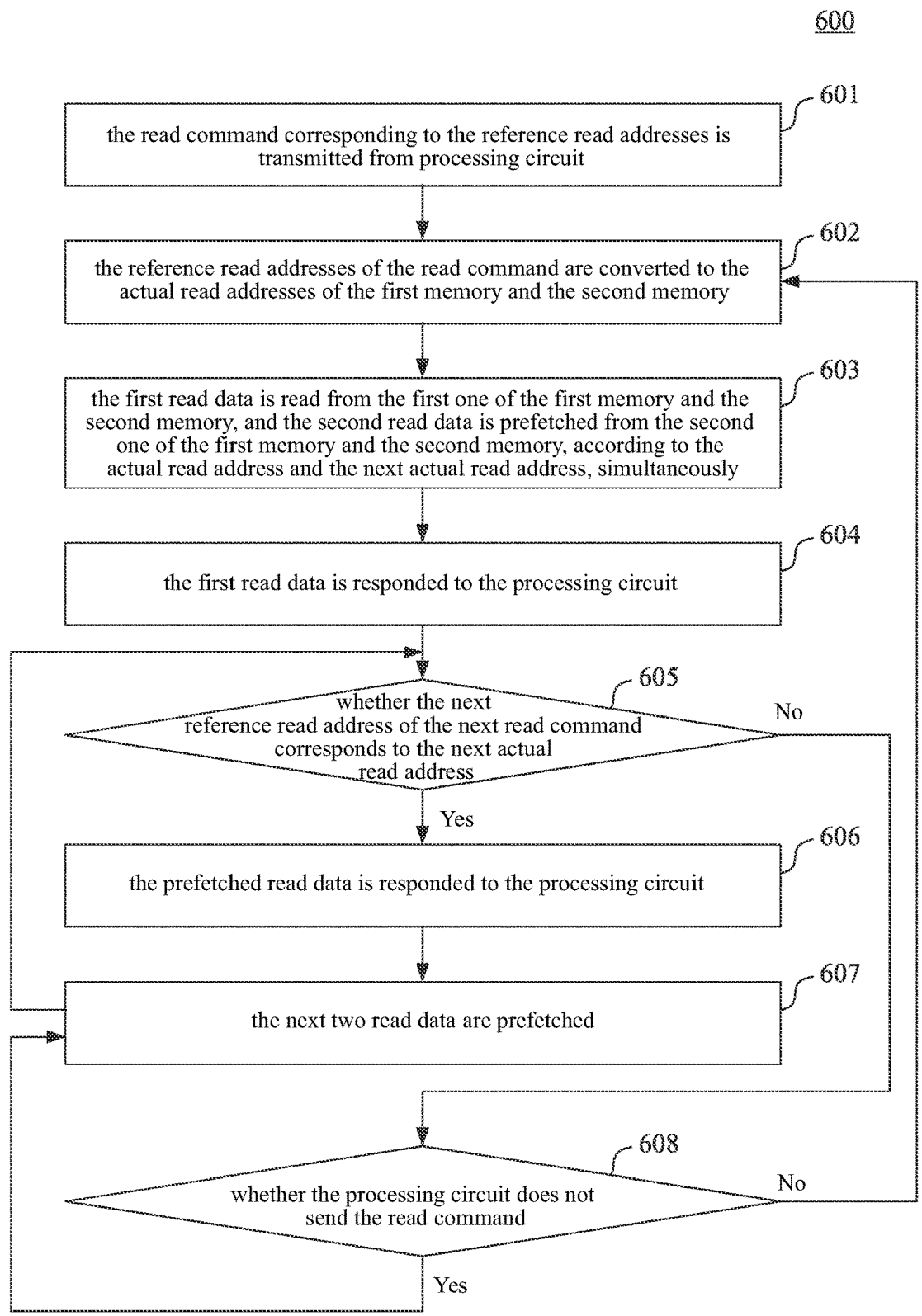
FIG. 6 is a flow diagram of a method for operating the device in accordance with one embodiment of the present disclosure.

FIG. 6 is a flow diagram of a method 600 for operating the device 110 in accordance with one embodiment of the present disclosure.

The method 600 can be utilized to operate the device 110 as shown in FIG. 1, and the method 600 executes the read operation of the first memory SRAN1 and the second memory SRAM2 by the accessing circuit FET. The method 600 includes the following steps (The operations are not recited in the sequence in which the operations are performed. That is, unless the sequence of the operations is expressly indicated, the sequence of the operations is interchangeable, and all or part of steps may be simultaneously, partially simultaneously, or sequentially performed).

In step 601, the read command RC corresponding to the reference read command is received, by the accessing circuit FET, from the processing circuit 100.

In step 602, the reference read address is converted to the actual read address of the first memory SRAM1 and the second memory SRAM2, by the accessing circuit FET, wherein the multiple reference addresses of the processing circuit 100 alternately correspond to the multiple actual addresses of the first memory and the second memory.

In step 603, the first read data RD1 is read from the first one of the first memory SRAM1 and the second memory SRAM2, and the second read data RD2 is prefetched from the second one of the first memory SRAM1 and the second memory SRAM2, by the accessing circuit FET, according to the actual read address and the next first actual read address, simultaneously.

In step, 604, the first read data RD1 is outputted to the processing circuit 100 by the accessing circuit FET.

In step 605, the next read command RC corresponding to the next first reference read address is received, and whether the next first reference read address corresponds the next first actual read address is determined, by the accessing circuit FET.

In step 606, when the next first reference read address of the next read command RC corresponds to the next first actual read address, the prefetched read data such as the second read data RD2, is outputted by the accessing circuit FET to the processing circuit 100.

In step 607, the next two piece of read data are prefetched and respectively stored to the first read register BUF1 and the second register BUF2, by the accessing circuit FET.

To explain in more detail, the accessing circuit FET prefetches the third read data RD3 from the first memory SRAM1, and prefetches the fourth read data RD4 from the second memory SRAM2, according to the next second actual read address and the next third actual read address, and the accessing circuit FET respectively stores the third read data RD3 and the fourth read data RD4 to the first register BUF1 and the second register BUF2.

After step 607, the procedure will return to the step 605 to determine the next first received read command, continuously.

In step 605, when the accessing circuit FET determines that the next first reference read address does not correspond to the next first actual read address, in the step 608, whether the processing circuit 100 does not send the read command is determined by the accessing circuit FET.

When the accessing circuit FET determines that the processing circuit 100 does not send the read command, the procedure will proceed to the step 607 to continuously prefetch the read data. When the accessing circuit FET determines that the processing circuit 100 does send the read command, the procedure will return to the step 602, so as to read the first memory SRAM1 and the second memory SRAM2 according to the new read address.

Figure 7:
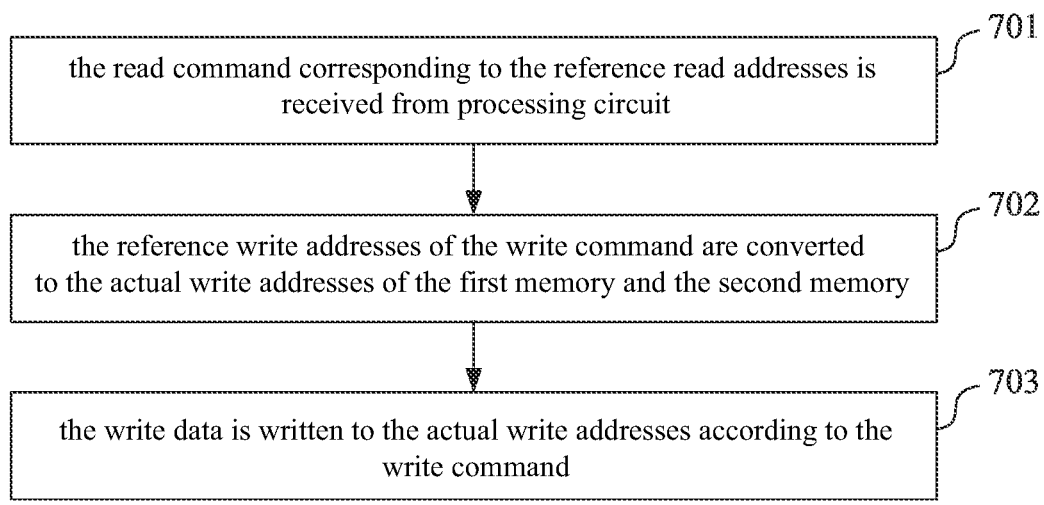
FIG. 7 is a flow diagram of a method for operating the device in accordance with one embodiment of the present disclosure.

FIG. 7 is a flow diagram of a method 700 for operating the device 110 in accordance with one embodiment of the present disclosure.

The method 700 can be utilized to operate the device 110 as shown in FIG. 1, and the method 700 executes the write operation of the first memory SRAM1 and the second memory SRAM2 by the accessing circuit FET. The method 700 includes the following steps (The operations are not recited in the sequence in which the operations are performed. That is, unless the sequence of the operations is expressly indicated, the sequence of the operations is interchangeable, and all or part of steps may be simultaneously, partially simultaneously, or sequentially performed).

In step 701, the write command WC corresponding to the reference read address is received from the processing circuit 100 by the accessing circuit FET.

In step 702, the reference write address is converted to the actual write address of the first memory SRAM1 and the second memory SRAM2 by the accessing circuit FET.

In step 703, the write data WD is written to the actual write address according to the write command WC by the accessing circuit FET.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A device, comprising:
   a first memory and a second memory adapted for coupling to a processing circuit, a plurality of actual addresses of the first memory and the second memory alternately corresponding to a plurality of reference addresses of the processing circuit; and
   an accessing circuit coupled to the first memory and the second memory and configured to:
   receive a read command corresponding to a reference read address from the processing circuit and convert the reference read address to an actual read address of the first memory and the second memory;
   read a first read data and prefetch a second read data, simultaneously, wherein the first read data is read from a first one of the first memory and the second memory and the second read data is prefetched from a second one of the first memory and the second memory, according to the actual read address and a next first actual read address adjacent to the actual read address;
   output the first read data to the processing circuit; and
   determine whether a next read command provided by the processing circuit is received, and wherein,
   when the next read command is not received due to an idle state of the processing circuit is determined, prefetch a third read data from the first one of the first memory and the second memory and prefetch a fourth read data from the second one of the first memory and the second memory, simultaneously, according to a next second actual read address adjacent to the next first actual read address and a next third actual read address adjacent to the next second actual read address.

2. The device of claim 1, wherein:
   if the next read command provided by the processing circuit has been received is determined, the accessing circuit is configured to convert the next read command to a next first reference read address;
   the accessing circuit is configured to determine whether the next first reference read address corresponds to the next first actual read address;
   if the next first reference read address corresponds to the next first actual read address is determined, the accessing circuit is configured to prefetch the third read data from the first one of the first memory and the second memory, and is configured to prefetch the fourth read data from the second one of the first memory and the second memory simultaneously, according to the next second actual read address and the next third actual read address, and output the second read data to the processing circuit; and
   if the next first reference read address does not correspond to the next first actual read address is determined, the accessing circuit is configured to read a fifth read data from the first one of the first memory and the second memory, and is configured to prefetch a sixth read data from the second one of the first memory and the second memory, according to a memory read address corresponding to the next first reference read address and a next first memory read address adjacent to the memory read address.

3. The device of claim 1, wherein the read command is transmitted from the processing circuit in at least one of unit clocks, the first read data and the second read data are read from the first memory and the second memory in two of the unit clocks, and the first read data and the second read data are read by the processing circuit in one of the unit clocks.

4. The device of claim 1, further comprising a first read register and a second read register respectively configured to temporarily store the first read data and the second read data.

5. The device of claim 1, wherein the plurality of actual addresses of the first memory and the second memory correspond to data of one word length.

6. The device of claim 1, wherein an Mth actual address of the plurality of actual addresses of the first memory corresponds to an (2M-1)th reference address of the plurality of the reference addresses of the processing circuit, wherein an Mth actual address of the plurality of the actual addresses of the second memory correspond to an 2Mth reference address of the plurality of the reference addresses of the processing circuit, and wherein M is a positive integer greater than or equal to 1.

7. The device of claim 1, wherein the accessing circuit is further configured to receive a write command corresponding to a reference write address from the processing circuit, to convert the reference write address to an actual write address of the first memory and the second memory, and the accessing circuit is further configured to write a write data to the actual write address according to the write command.

8. The device of claim 7, wherein the write command is received from the processing circuit in at least a unit clock, wherein the write data is written in two of the unit clocks.

9. The device of claim 1, wherein the device has a structure without a write register.

10. A method for operating a device, comprising:
receiving a read command corresponding to a reference read address, by an accessing circuit, from a processing circuit, to convert the reference read address to an actual read address of a first memory and a second memory, wherein a plurality of reference addresses of the processing circuit alternately correspond to a plurality of actual addresses of the first memory and the second memory;
reading a first read data and prefetching a second read data, simultaneously, wherein the first read data is read from a first one of the first memory and the second memory and the second read data is prefetched from a second one of the first memory and the second memory, by the accessing circuit, according to the actual read address and a next first actual read address;
outputting the first read data to the processing circuit by the accessing circuit;
determining whether a next read command provided by the processing circuit is received; and
when the next read command is not received due to an idle state of the processing circuit is determined, prefetching a third read data from the first one of the first memory and the second memory and prefetching a fourth read data from the second one of the first memory and the second memory, simultaneously, according to a next second actual read address adjacent to the next first actual read address and a next third actual read address adjacent to the next second actual read address, while the processing circuit is idle and not providing a next read command to the accessing circuit.

11. The method of claim 10, further comprising:
if the next read command provided by the processing circuit has been received is determined, converting the next read command to a next first reference read address;
determining whether the next first reference read address corresponds to the next first actual read address;
if the next first reference read address corresponds to the next first actual read address is determined, prefetching the third read data from the first one of the first memory and the second memory by the accessing circuit, and prefetching the fourth read data from the second one of the first memory and the second memory simultaneously by the accessing circuit, according to the next second actual read address and the next third actual read address, and outputting the second read data to the processing circuit; and if the next first reference read address does not correspond to the next first actual read address is determined, reading a fifth read data from the first one of the first memory and the second memory, and prefetching a sixth read data from the second one of the first memory and the second memory, by the accessing circuit, according to a memory read address corresponding to the next first reference read address and a next first memory read address adjacent to the memory read address.

12. The method of claim 10, wherein the read command is transmitted from the processing circuit in at least one of unit clocks, the first read data and the second read data are read from the first memory and the second memory in two of the unit clocks, and the first read data and the second read data are read by the processing circuit in one of the unit clocks.

13. The method of claim 10, further comprising:
temporarily storing the first read data in a first read register and the second read data in a second read register.

14. The method of claim 10, wherein the plurality of actual addresses of the first memory and the second memory correspond to data of one word length.

15. The method of claim 10, wherein an Mth actual address of the plurality of actual addresses of the first memory corresponds to an (2M-1)th reference address of the plurality of the reference addresses of the processing circuit, wherein an Mth actual address of the plurality of the actual addresses of the second memory correspond to an 2Mth reference address of the plurality of the reference addresses of the processing circuit, and wherein M is a positive integer greater than or equal to 1.

16. The method of claim 10, further comprising:
receiving a write command corresponding to a reference write address from the processing circuit, by the accessing circuit, to convert the reference write address to an actual write address of the first memory and the second memory; and
writing a write data to the actual write address, by the accessing circuit, according to the write command.

17. The method of claim 16, wherein the write command is received from the processing circuit in at least a unit clock, and the write data is written in two of the unit clocks.

* * * * *